H. MEHNER.
PROCESS FOR MELTING AND WORKING QUARTZ GLASS.
APPLICATION FILED AUG. 14, 1906.
931,945.
Patented Aug. 24, 1909.
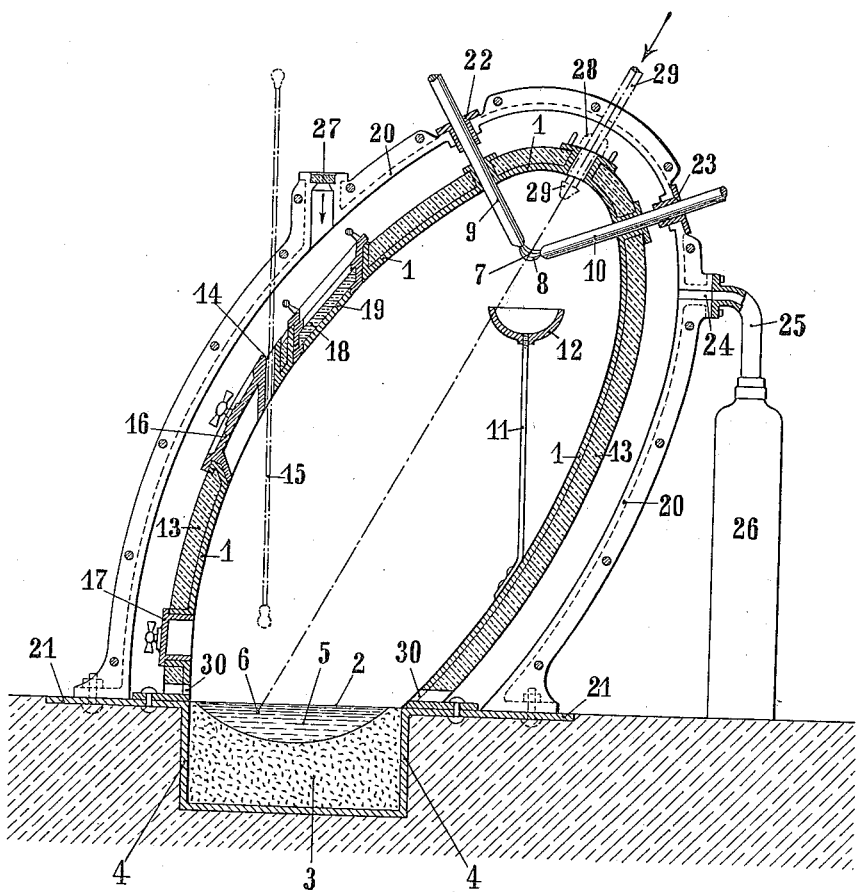

UNITED STATES PATENT OFFICE.

HERMANN MEHNER, OF FRIEDENAU, NEAR BERLIN, GERMANY.

PROCESS FOR MELTING AND WORKING QUARTZ GLASS.

931,945.	Specification of Letters Patent.	Patented Aug. 24, 1909.

Application filed August 14, 1906. Serial No. 330,538.

*To all whom it may concern:*

Be it known that I, HERMANN MEHNER, of Friedenau, near Berlin, Germany, have invented certain new and useful Improvements in Processes for Melting and Working Quartz Glass, of which the following is a specification.

The object of my invention is to produce articles of molten quartz easily and rapidly. To this end my invention consists in a process of melting quartz by means of the rays of electric arcs.

The production of glass from quartz by melting the quartz immediately in or near the electric arc is a difficult matter, as the temperature of the electric arc is too high. For this reason I separate the hearth, on which the quartz is to be melted, from the electric arc, and only concentrate the rays of the electric arc upon the hearth by suitable reflectors. I, at the same time, take care that no excessive concentration of the heat can take place.

As the quartz has the quality of evaporating under ordinary pressure near the melting point I take provisions for effecting the melting of the quartz at first under pressure, whereby I am able to liquefy the quartz without any evaporation worth mentioning. To attain this thinly liquid state of the quartz is of great importance for the production of glass from quartz, as only then the air contained in the quartz can escape. As soon as I have in this way reached this highly liquid state of the quartz by melting it, I cool the same again down to that temperature at which it assumes, under ordinary pressure, a consistence, in which it can be worked, the same as ordinary glass, into articles of any shape. This working of the molten quartz is carried on under ordinary pressure.

In order that my invention and the carrying out of the same may be clearly understood by those acquainted with this art I have shown on the drawing an apparatus by which the object of this invention can be attained.

The drawing represents a melting-furnace in a vertical section.

On the drawing the wall of the furnace is marked with 1. This wall of the furnace has the form of an ellipsoid, from which the lower part is cut off. The cut off part 1 of the ellipsoid, which forms the space for the furnace, is bordered at its lower end by the surface 2 of the object to be melted. The quartzose material 3 to be melted is placed into a kettle-shaped hearth-reservoir 4. On the drawing a part 5 of the quartzose material in the reservoir is represented in a molten state. This molten part 5 of the quartz surrounds the lower focus 6 of the ellipsoid 1. In the upper focus 7 of the ellipsoid is placed the electric arc 8 between the two electrodes 9, 10. The electrodes 9 and 10 pass through openings in the wall of the ellipsoid 1. The ellipsoid 1 is on its inside reflective, and preferably consists of a refractory metal, for instance nickel. Other materials may however also be used, for instance quartz-glass lined with a reflecting covering. The surface of the ellipsoid is represented as fitted with a bar 11, which carries a cup 12 serving to catch impurities which fall off from the points of the electrodes. The wall of the ellipsoid is coated on the outside with a heat-insulating substance 13. In the wall of the ellipsoid are provided several openings. Of these openings one, which is marked with 14, is represented opened. Through this opening passes the shaft of a glass blowing pipe 15 for working the molten quartz-glass in the interior of the ellipsoidal furnace-space. Two further openings are represented as closed by closing-devices 16, 17. The opening closed by the closing-device 16, which communicates with the opening 14, represented as open, serves to take out the glass-blowing pipe 15 together with the object of quartz produced by it. The opening closed by the closing-device 17 serves to take out the molten quartz by means of a suitable device.

18 is a window serving to observe the process in the interior of the furnace. This window is of very refractory glass, such as quartz glass coated with a translucent reflecting layer 19, such as a thin film of platinum. 20 is an outside jacket or mantle, which is air-tightly united, by means of bolts, with the border 21 of the hearth-kettle 4. Through the mantle 20 are guided airtightly the electrodes 9, 10, for which purpose there are provided packing-rings 22, 23.

24 is a socket opening into the interior of the mantle 20, to which is connected, through a tube 25, a bottle 26, which is presumed to be filled with a compressed gas, for instance carbonic acid.

27 is an inspection-opening in the mantle

20. With 28 is marked a hood which carries a burner 29 extending through the wall of the ellipsoid 1. The hood 28 is detachably arranged on the surface of the ellipsoid 1. The hood 28 with the burner 29 is represented by dotted lines, as the same is taken off from the surface of the ellipsoid 1 as soon as the mantle 20 is put on. With 30 are marked openings in the lower part of the wall of the ellipsoid 1.

The apparatus works as follows: Through the opening of the ellipsoid 1, closed by the device 17, quartzose sand or other quartzose material is fed into the kettle 4. Hereupon the closing-device 17 is again inserted into the ellipsoidal mantle 1, and also all the other openings of the ellipsoidal mantle are closed, and the outer mantle 20 is thereupon placed over the ellipsoid 1. The mantle 20 is hereby assumed consisting of two parts, the plane of division being parallel to the plane of the paper of the drawing and not visible in the drawing. Now the electric arc 8 is generated in the focus 7 of the ellipsoid 1 between the electrodes 9, 10. The rays emanating from the electric arc are cast by the ellipsoid surface 1 upon the lower focus 6, as far as they do not fall directly upon the quartzose material. Under the influence of the rays falling upon the quartzose mass, this mass is greatly heated, whereas the furnace room inclosed by ellipsoid 1 is kept at a comparatively low temperature on account of the concentration of heat only in the focus of the reflecting ellipsoid. As soon as a considerable temperature has been reached, which will be when clouds commence to rise from the mass, the furnace is put under pressure, which is effected by establishing a connection between the interior of the bottle 26 and the interior of the mantle 20. The production of an increased pressure in the furnace makes it possible to increase the temperature of the softened quartzose mass, without any evaporation of the same taking place. In consequence of this increased temperature the quartzose mass gradually becomes highly liquid and in this state it allows all the air inclosed in it to escape. The pressure which is necessary in order to attain this object may vary according to circumstances. Higher pressure corresponds to a shorter length of the purifying process and vice versa. Therefore it is advisable to use higher pressure in connection with a small furnace and lower pressure in connection with large furnaces. A pressure of 400 to 500 pounds to the square inch will be satisfactory under ordinary conditions. As soon as the quartzose mass has been subjected for a sufficient length of time to the purifying process the temperature in the furnace is reduced, which is effected by suitable influences on the electric arc. The molten mass of quartz thereby gradually passes from the highly liquid state into the state of viscosity in which it is suited for being worked. As soon as this state is reached the communication between the interior of the mantle 20 with the interior of the bottle 26 is interrupted and the mantle 20 removed. After removing the mantle 20 the ordinary atmospheric pressure is reëstablished in the furnace. Now the hood 28 with the burner 29 is put upon the outer surface of the ellipsoid 1 and the burner, to which from any suitable place a combustible mixture of air and gas is conveyed, is ignited. The waste gases escape at the bottom, partly through the opening 14, partly through openings 30 at the lower end of the ellipsoidal mantle 1. By the ventilation in a downward direction traces of clouds of quartz, which might be formed above the molten mass, are removed, so that the rays coming from the electric arc can freely penetrate into the quartzose mass and the furnace can be observed through the window 18.

By means of the pipe 15 molten quartz can be taken out and worked into objects in the same way as molten glass.

Fresh quartz can be admitted in any suitable manner, for instance by opening the closing-device 17.

The apparatus here described and illustrated in the drawings may be modified in different ways without departing from the principle of the invention. Thus for instance instead of the ellipsoidal wall of the furnace a parabolic wall may be selected or a number of ellipsoid or parabolic sections may be made to form the vault of the furnace.

A noteworthy peculiarity of the new furnace consists therein that the wall of the furnace is kept cooler than the molten material. By a suitable application of a heat-insulating mass 13 the interior of the furnace is kept so hot that it is possible to work the molten quartz mass also above the surface of the hearth on which the rays of the electric arc are concentrated, and so that not too much heat is lost by radiation.

What I claim as my invention and desire to secure by United States Letters Patent is—

1. Process of melting and working quartz glass consisting in heating quartz up to its melting point, subjecting the molten quartz to pressure while being heated to a condition of high liquidity, letting the mass cool down so far that it remains homogeneously molten and in working the molten mass at such condition of viscosity.

2. Process of melting and working quartz glass consisting in exposing quartz, under pressure higher than atmospheric, to the action of the rays of electric arcs, which are concentrated by reflectors until the mass of quartz has become highly liquid, and in thereafter letting the mass cool down so far that it remains homogeneously molten, and in working the molten mass under atmospheric pressure.

3. Process of melting and working quartz glass consisting in exposing quartz, under pressure higher than atmospheric, to the action of the rays of electric arcs, which are concentrated by reflectors until the mass of quartz has become highly liquid, and in thereafter letting the mass cool down so far that it remains homogeneously molten, and in working the molten mass under atmospheric pressure, while a ventilation from the top to the bottom is produced in the furnace.

4. Process of melting and working quartz glass consisting in heating quartzose material by an electric arc in a furnace provided with reflecting surfaces, keeping the material under pressure when molten to a condition of high liquidity, letting thereafter the mass cool down to a condition of less liquidity and working it at such condition of viscosity under ordinary pressure.

In testimony whereof I have signed this specification in the presence of two subscribing witnesses.

HERMANN MEHNER.

Witnesses:
   HENRY HASPER,
   WILLIAM MAYNER.